United States Patent
Sterrett (10) Patent No.: US 11,352,029 B2
(45) Date of Patent: Jun. 7, 2022

(54) LEVEL CONTROL SYSTEM FOR ADJUSTING THE LEVEL OF A VEHICLE, IN PARTICULAR A RAIL VEHICLE

(71) Applicant: KNORR-BREMSE SYSTEME FÜR SCHIENENFAHRZEUGE GMBH, Munich (DE)

(72) Inventor: Mark A. Sterrett, Hanover, PA (US)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 16/763,148

(22) PCT Filed: Sep. 17, 2018

(86) PCT No.: PCT/EP2018/075009
§ 371 (c)(1),
(2) Date: May 11, 2020

(87) PCT Pub. No.: WO2019/091636
PCT Pub. Date: May 16, 2019

(65) Prior Publication Data
US 2020/0307656 A1    Oct. 1, 2020

(30) Foreign Application Priority Data

Nov. 9, 2017 (EP) .................... 17200882
Jul. 31, 2018 (DE) .............. 10 2018 118 464.6

(51) Int. Cl.
*B61F 5/22* (2006.01)
*B60G 17/027* (2006.01)

(52) U.S. Cl.
CPC ........... *B61F 5/22* (2013.01); *B60G 17/0272* (2013.01); *B60G 2300/10* (2013.01); *B60G 2500/302* (2013.01)

(58) Field of Classification Search
CPC ... B61F 5/22; B60G 17/0272; B60G 2300/10; B60G 2500/302; B60G 2500/30
See application file for complete search history.

(56) References Cited

U.S. PATENT DOCUMENTS 3,667,878 A * 6/1972 Reeve ................. F04D 7/04
418/173
2003/0107161 A1 6/2003 Teichmann et al.
(Continued)

FOREIGN PATENT DOCUMENTS

DE          19646827 C1    1/1998
DE   10 2015 202 118 A1    8/2016
(Continued)

OTHER PUBLICATIONS

International Search Report and Written Opinion corresponding to PCT/EP2018/075009, dated Dec. 17, 2018.

*Primary Examiner* — Darlene P Condra
(74) *Attorney, Agent, or Firm* — Barnes & Thornburg LLP (57) ABSTRACT

A level control system adjusts the level of a rail vehicle, and includes at least one level control cylinder and a level control piston. The level control piston is at least partly received in the level control cylinder in a movable manner. The level control system has at least one first hydraulic connection, wherein the level control cylinder or the level control piston has a collared shoulder, in which at least one first fluid channel connected to the first hydraulic connection is arranged. At least one first attachment for receiving the first hydraulic connection is provided along the collared shoulder, the first attachment, being arranged on the collared shoulder tangentially to the longitudinal axis of the level control cylinder or of the level control piston such that at least one tangential external fluid connection on the collared (Continued)

shoulder can be connected to the at least one first hydraulic connection.

19 Claims, 3 Drawing Sheets

(56) References Cited

U.S. PATENT DOCUMENTS

| | | | |
|---|---|---|---|
| 2005/0029064 A1* | 2/2005 | Gaile | B60G 17/056 188/322.21 |
| 2007/0035103 A1* | 2/2007 | Anton | F16F 3/10 280/124.16 |
| 2012/0180693 A1* | 7/2012 | Haas | B61F 5/22 105/206.1 |
| 2015/0021445 A1* | 1/2015 | Franks | B61F 5/02 246/218 |
| 2016/0176417 A1* | 6/2016 | Gaile | B61F 5/10 105/199.3 |

FOREIGN PATENT DOCUMENTS

| | | |
|---|---|---|
| WO | 2011032850 A1 | 3/2011 |
| WO | 2012115927 A1 | 8/2012 |

* cited by examiner

LEVEL CONTROL SYSTEM FOR ADJUSTING THE LEVEL OF A VEHICLE, IN PARTICULAR A RAIL VEHICLE

CROSS REFERENCE AND PRIORITY CLAIM

This patent application is a U.S. National Phase of International Patent Application No. PCT/EP2018/075009 filed Sep. 17, 2018, which claims priority to German Patent Application No. 10 2018 118 464.6 and claims priority to European Patent Application No. 17200882.3, the disclosure of which being incorporated herein by reference in their entireties.

FIELD

The disclosed embodiments relate to a level control system for adjusting the level of a vehicle, in particular a rail vehicle, having at least one level control cylinder and one level control piston, wherein the level control piston is at least partially movably received in the level control cylinder.

BACKGROUND

It is known that level control systems for rail vehicles, using which the height between the bogie and the vehicle superstructure can be adjusted for the purposes of regulating the height of the superstructure of the rail vehicle.

SUMMARY

Disclosed embodiments provide a level control system of the type mentioned at the outset in an advantageous manner, in particular such that a space-saving level control system is provided which enables the level of the vehicle to be adjusted and permits efficient and cost-effective installation and maintenance.

Disclosed embodiments provide a level control system for adjusting the level of a vehicle, in particular a rail vehicle, having at least one level control cylinder and one level control piston is provided, wherein the level control piston is at least partially movably received in the level control cylinder. The level control system has at least one first hydraulic connector, wherein the level control cylinder or the level control piston has a collar-like shoulder in which at least one first fluid channel connected to the first hydraulic connector is arranged. At least one first boss for receiving the first hydraulic connector is provided along the collar-like shoulder, wherein the first boss is, in relation to a longitudinal axis of the level control cylinder or of the level control piston, arranged tangentially on the collar-like shoulder such that at least one external fluid connection is connectable tangentially on the collar-like shoulder to the at least one first hydraulic connector.

BRIEF DESCRIPTION OF FIGURES

Further details and advantages of the disclosed embodiments will now be discussed with reference to exemplary embodiments illustrated in more detail in the drawings. In the drawings.

DETAILED DESCRIPTION

DE 103 15 000 A1 has disclosed a device for secondary suspension. For the secondary suspension, a spring element is provided between the bogie and the car body, which spring element may be an active hydraulic spring, gas spring or the like or else a passive spring in the form of a steel spring or the like designed in the manner of a compression spring. A pulling cylinder is provided between the bogie and the car body for the spring element, with which pulling cylinder a restoring force acting counter to the force of the spring element can be generated in order to bring the car body from the raised travel level to a lowered platform level (loading/unloading position) and hold the car body there. A deactivation of the pulling cylinder has the effect that the car body moves back to the raised travel level by the restoring force of the spring stage. The pulling cylinder is in this case a hydraulic cylinder which can be pressurized in a single-acting manner. In order to effect the pulling action, that is to say in order that the piston rod plunges into the cylinder body of the pulling cylinder in the event of charging with pressure medium, the internal piston is charged with pressure medium at a cylinder cover side.

U.S. Pat. No. 9,315,203 B2 has likewise disclosed a level control system for a rail vehicle, which level control system can raise the car body of the rail vehicle using hydraulic cylinders. Here, the hydraulic cylinders are connected to the bogie of the rail vehicle.

It is, therefore, the technical utility of the disclosed embodiments to further develop a level control system of the type mentioned at the outset in an advantageous manner, in particular such that a space-saving level control system is provided which enables the level of the vehicle to be adjusted and permits efficient and cost-effective installation and maintenance.

This is achieved by the disclosed level control system for adjusting the level of a vehicle, in particular a rail vehicle, having at least one level control cylinder and one level control piston is provided, wherein the level control piston is at least partially movably received in the level control cylinder. The level control system has at least one first hydraulic connector, wherein the level control cylinder or the level control piston has a collar-like, or collared, shoulder in which at least one first fluid channel connected to the first hydraulic connector is arranged. At least one first boss for receiving the first hydraulic connector is provided along the collar-like shoulder, wherein the first boss is, in relation to a longitudinal axis of the level control cylinder or of the level control piston, arranged tangentially on the collar-like shoulder such that at least one external fluid connection is connectable tangentially on the collar-like shoulder to the at least one first hydraulic connector.

The disclosed embodiments are based on the basic idea that the installation of a level control system can be both simplified and optimized in terms of its functionality using an integral construction, in particular of the level control cylinder.

Furthermore, a decisive, significant reduction of the structural space height of the level control system, in particular in the region of the level control piston and of the level control cylinder, can be achieved. Accordingly, the structural space height can, using an integral construction of the components, be reduced to approximately half of the originally required structural space of a lifting cylinder.

In particular, a space-saving construction and simplified production of the level control system can be achieved. Functional characteristics of the level control system are optionally contained or integrated directly in the geometrical construction of the level control cylinder and/or of the level control piston.

Furthermore, simplified handling of the level control system can be provided not only during operation, for example in the form of the hydraulic connectors arranged on the level control cylinder. Rather, the maintenance and servicing of the level control system can also be optimized by virtue of the level control system being constructed with a smaller number of components and so as to be easily accessible.

Consequently, the advantages of a level control system according to the disclosed embodiments are noticeable not only during the running time of the level control system, but also in the course of the production, installation and maintenance of the system, in particular with regard to simplified handling of the system.

According to the disclosed embodiments, the level control piston is provided so as to be at least partially movable in the level control cylinder for the purposes of adjusting the level of the rail vehicle.

The level control piston is, correspondingly to a conventional lifting cylinder, arranged movably within the level control cylinder.

The level control cylinder is optionally designed as a hydraulically actuatable level control cylinder.

In a retracted state of the level control system, the level control piston is optionally arranged or received entirely within the level control cylinder.

Alternatively, the level control piston is, in the retracted state, arranged at least partially or mostly within the level control cylinder.

In an extended state of the level control system, the level control piston is arranged partially or mostly outside the level control cylinder. A stroke is thus provided between the retracted and the extended state of the level control system.

The level control system has a first hydraulic connector.

The first hydraulic connector can be used as an inlet and as an outlet or drain valve for a hydraulic fluid.

It is, thus, possible for a first hydraulic connector to be able to be used as an inlet and as an outlet or drain valve.

The at least one first boss may be formed integrally on the collar-like shoulder.

In particular, it is furthermore conceivable for the at least one first boss to be formed in a single-piece and/or materially bonded manner on the collar-like shoulder. This may also be implemented in the same way for further bosses, if present.

In conjunction with a single-piece design, it is conceivable for the first boss and the collar-like shoulder to be formed from a single workpiece and/or material.

In conjunction with a materially bonded design, it is possible for the first boss to be formed integrally on the collar-like shoulder, for example by brazing or welding.

Provision is furthermore made whereby the level control cylinder or the level control piston has a collar-like shoulder in which at least one first fluid channel connected to the first hydraulic connector is arranged.

The collar-like shoulder for forming the first hydraulic connector and the fluid lines is optionally provided on the level control cylinder.

Below, the configuration of the at least one first hydraulic connector on the level control cylinder will be considered and discussed by way of example. The same statements substantially likewise apply to an embodiment in the course of which the first hydraulic connector is configured on the level control piston.

A collar-like shoulder or circumference of the level control cylinder may be regarded as a shoulder along the cylindrical main geometry of the level control cylinder.

The collar-like shoulder is optionally provided on an open cylinder side of the level control cylinder, through which the level control piston can move relative to the level control cylinder. Alternatively, the collar-like shoulder is arranged on that end of the level control piston which projects out of the level control cylinder.

Accordingly, the first hydraulic connector extends in particular in an orthogonal direction with respect to a vertical plane of symmetry of the level control cylinder.

The tangentially adjoining first hydraulic connector permits a space-saving connection of the level control system to a fluid/hydraulic circuit for the supply of a suitable fluid to the level control system.

Provision is furthermore made whereby the first fluid channel is configured in the collar-like shoulder, in particular so as to be connected in terms of flow to the first hydraulic connector.

Optionally, the first fluid channel may be provided so as to be integrated, or formed integrally, in the cylinder wall of the level control cylinder.

Provision is made whereby the first hydraulic connector opens into the first fluid channel of the level control cylinder.

The level control cylinder may be formed with the first fluid channel such that an expedient introduction and discharge of fluid or hydraulic liquid into and out of the inner diameter is available for the purposes of expedient movement of the level control piston.

Sealing elements or the like, for example for sealing the level control piston with respect to the level control cylinder, may be arranged substantially independently of the hydraulic connectors along the inner diameter of the level control cylinder.

This is made possible using an expedient configuration of the first and second fluid channels, wherein the first and second hydraulic connectors may be arranged at the open cylinder side of the level control cylinder.

The first fluid channel may extend from the first hydraulic connector, along the collar-like circumference or shoulder of the level control cylinder, as far as into the cylinder wall, in order to open into the inner diameter or the inner volume at any desired height of the level control cylinder.

Using the first fluid channel, it is possible for a fluid to be caused to flow into and/or out of the inner diameter of the level control cylinder at any desired expedient position.

In this way, a space-saving arrangement and flexible configuration of a fluid connection between the at least one first hydraulic connector and the inner diameter of the level control cylinder is available.

Consequently, the disclosed embodiments are able to create a simplified and effective embodiment of a level control system using an advantageous construction, which in particular provides a space-saving arrangement of the first hydraulic connector and of the integrally configured fluid channel.

Alternatively, the level control system may be provided with a second hydraulic connector connected in terms of flow to a second fluid channel.

The first hydraulic connector may be usable as an inlet, wherein the second hydraulic connector may be usable as a drain valve or outlet for a pressure fluid.

It is likewise possible for the first and second hydraulic connectors to be usable in a reversed form.

Furthermore, at least one first boss for receiving the first hydraulic connector is provided along the collar-like shoulder, wherein the first boss is, in relation to a longitudinal axis of the level control cylinder or of the level control piston, arranged tangentially on the collar-like shoulder such that at least one external fluid connection is connectable tangentially on the collar-like shoulder to the at least one first hydraulic connector.

Along the collar-like shoulder, there is provided at least one first boss, on which or in which the first hydraulic connector is integrally formed or received.

With respect to the longitudinal axis of the level control cylinder, the first hydraulic connector can be received, and in particular positioned or arranged so as to run tangentially along the outer diameter of the collar-like shoulder, using the boss.

By virtue of the first hydraulic connector being arranged and formed tangentially on the collar-like shoulder of the level control cylinder using the first boss, an external fluid connection can be connectable tangentially on the collar-like shoulder to the at least one first hydraulic connector.

It is thus possible for an integral and space-saving arrangement of the at least one first hydraulic connector to be provided.

A breakaway of the external fluid connection from the first hydraulic connector is prevented owing to the formation of the first hydraulic connector along the level control cylinder, in particular in relation to an arrangement of the hydraulic connector on the level control piston.

Furthermore, in the context of the disclosed embodiments, it is optionally possible for at least one second boss to be provided for the integral formation or receiving of a second hydraulic connector on the collar-like shoulder of the level control cylinder.

According to a further embodiment, the at least one first boss is formed as a cutout on the collar-like shoulder, such that the first hydraulic connector can be arranged on the first boss.

The boss may be formed as a cutout or a milled-out portion for receiving the first hydraulic connector.

The first hydraulic connector is optionally integrally formed in an expedient manner on the first boss.

According to one embodiment, the at least one first boss is formed as an elevation which projects beyond the outer diameter of the collar-like shoulder, such that the first hydraulic connector can be arranged on an outer side of the collar-like shoulder tangentially with respect to the outer diameter of the collar-like shoulder.

In particular, the first hydraulic connector may be received in the elevation of the first boss, such that the first hydraulic connector is positioned and supported.

In the context of the disclosed embodiments, using the first hydraulic connector and the first boss, it is possible for a tangentially oriented connection of an external fluid connection to be realized along the circular basic geometry of the collar-like shoulder.

Furthermore, in the context of the disclosed embodiments, a second boss and a second hydraulic connector may be provided in an identical manner to the first boss and first hydraulic connector.

Optionally, the first and second hydraulic connector or boss are arranged in a symmetrically distributed manner along the collar-like shoulder.

In one embodiment, the at least one first hydraulic connector is connected in non-positively and/or positively locking fashion to the at least one first boss of the collar-like shoulder.

In particular, the first hydraulic connector may be welded, adhesively bonded, screwed or clamped to or on the first boss of the collar-like shoulder, pressed into the bosses, or the like.

In this context, the first hydraulic connector may be formed as one part or as several parts with the collar-like shoulder of the level control cylinder.

According to a further embodiment, the level control piston has a substantially constant or continuous outer diameter over its entire length.

In particular, the level control piston may have a substantially constant outer diameter, if the collar-like shoulder is formed on the level control cylinder.

The level control piston is provided in particular as an elongate cylinder which is suitable for acting as a hydraulic piston.

The substantially constant outer diameter optionally relates to the general outer dimensions of the cylindrical basic shape of the level control piston.

Deviating from the substantially constant cylinder shape, the level control piston may, in the context of the disclosed embodiments, have grooves or the like along its outer circumference in the lower region in relation to the installed state, for example for the purposes of permitting a suitable fluid transfer into the inner diameter of the level control cylinder.

In this way, a level control piston is available which can be produced and handled easily in the context of the level control system according to the disclosed embodiments.

Since the level control piston optionally has no collar or a similar shoulder, the structural space height can be significantly reduced.

In particular, the structural space height of the level control system can be significantly reduced using the level control piston with substantially constant outer diameter.

The required structural space height of the level control system with a collarless level control piston can optionally be reduced to approximately half of an original structural space height, conventionally provided for level control systems, in the region of the level control piston and of the level control cylinder.

Owing to the greatly reduced structural height, it is possible to integrate the level control cylinder into existing vehicle concepts without significant redesign.

Functional components of the level control system, such as fluid channels or seals for example, are optionally provided or integrated in the level control cylinder.

According to a further embodiment, a single fastening element is provided for connecting the level control piston to the level control cylinder.

In particular, the fastening element is provided such that the level control cylinder and the level control piston are connectable or couplable to one another indirectly (for example via a corresponding guide element or guide elements and one or more guide grooves).

Accordingly, the connection using the one fastening element can be understood in particular to mean an expedient assembling of the level control cylinder and of the level control piston.

The single fastening element is optionally arranged centrally, in particular along a longitudinal axis of the level control cylinder or of the level control piston.

In the context of the disclosed embodiments, the longitudinal axis may be understood as a common longitudinal axis of the level control cylinder and of the level control piston, wherein a lifting movement of the level control piston takes place along the longitudinal axis.

Using a single fastening element, a low level of installation effort or maintenance effort is required for the level control system.

Furthermore, a uniform connecting force or contact pressure can be achieved in the course of the expedient connection of the level control piston to the level control cylinder for the purposes of providing a suitable lifting cylinder.

In particular, a coupling of the level control cylinder to the level control piston is provided using the fastening element such that the level control piston is at least partially movably received in the level control cylinder.

Optionally, only the one fastening element is required for the connection or for the assembling of the level control piston with the level control cylinder.

In this way, the effort required for the production or for the assembling and/or for the maintenance of the level control system according to the disclosed embodiments can be advantageously reduced.

Furthermore, in the context of the disclosed embodiments, the level control cylinder and the level control piston are connected or coupled to one another such that a relative movement of the level control piston is possible up to a maximum range of movement or up to a maximum stroke.

Accordingly, provision is made whereby, using the fastening element, a non-positively and/or positively locking connection is present when the level control piston reaches a maximum range of movement with respect to the level control cylinder.

In particular, the fastening element causes this non-positively and/or positively locking connection indirectly, optionally in interaction with at least one guide element.

It is conceivable that the fastening element positions the at least one guide element between the level control cylinder and the level control piston in such a way that a stop is reached beyond a maximum range of movement or stroke of the level control piston.

According to a further embodiment, provision is made whereby the level control piston has a central bore which is designed to receive the fastening element.

Provision is optionally made whereby the fastening element is arranged centrally within the piston or the level control system.

Accordingly, the level control system, in particular the level control cylinder and the level control piston, can be expediently connected or coupled together or assembled using a single fastening element.

Furthermore, using the central arrangement of the bore for the single fastening element, a significant reduction of the structural space can be achieved.

According to a further embodiment, at least one guide element is provided which, in conjunction with the fastening element, is positioned such that the level control cylinder provides a first and a second end stop for the relative movement of the level control piston with the at least one guide element.

In particular, in the assembled state of use of the level control system, the at least one guide element is, using the fastening element, provided in a position such that the guide element projects out of the level control piston.

The at least one guide element can optionally be displaced using the fastening element into a position such that the guide element is fixed and projects beyond the outer diameter of the level control piston.

In particular, at least two guide elements may be provided which project beyond the outer diameter of the level control piston on opposite sides thereof.

The at least one projecting guide element can engage into the level control cylinder, such that end stops are provided in the course of the relative movement between the level control cylinder and the level control piston.

At least one end stop is provided by a connection or an interaction between the fastening element in the level control piston, the at least one guide element and the level control cylinder.

According to one embodiment, the guide element is provided so as to project out of the level control piston such that the guide element engages into a corresponding guide groove of the level control cylinder in order to provide a predefinable relative movement between level control piston and level control cylinder.

In particular, any desired and expedient relative movement between the level control cylinder and the level control piston can be predetermined using corresponding guide grooves along the inner diameter of the level control cylinder.

It is thus possible, for example, for a relative rotation between level control cylinder and level control piston to be prevented using guide grooves which run in a vertically straight or rectilinear manner.

According to a further embodiment, the fastening element is a screw or a bolt.

The fastening element is optionally provided as a screw.

It is thus possible for the fastening element in screw form to be screwed into the central bore of the level control piston in order to realize expedient assembling of the level control piston and of the level control cylinder.

In this context, the central bore of the level control piston can be provided as a bore which is at least partially configured with an internal thread.

Alternatively, the fastening element may be configured as a bolt.

The fastening element in the form of a bolt may be fastened within the central bore of the piston for example using a releasable clamping connection.

It is also conceivable that the bolt is secured, at its head, using further screws, pins or the like, such that expedient use of the level control system is possible.

Figure 1:
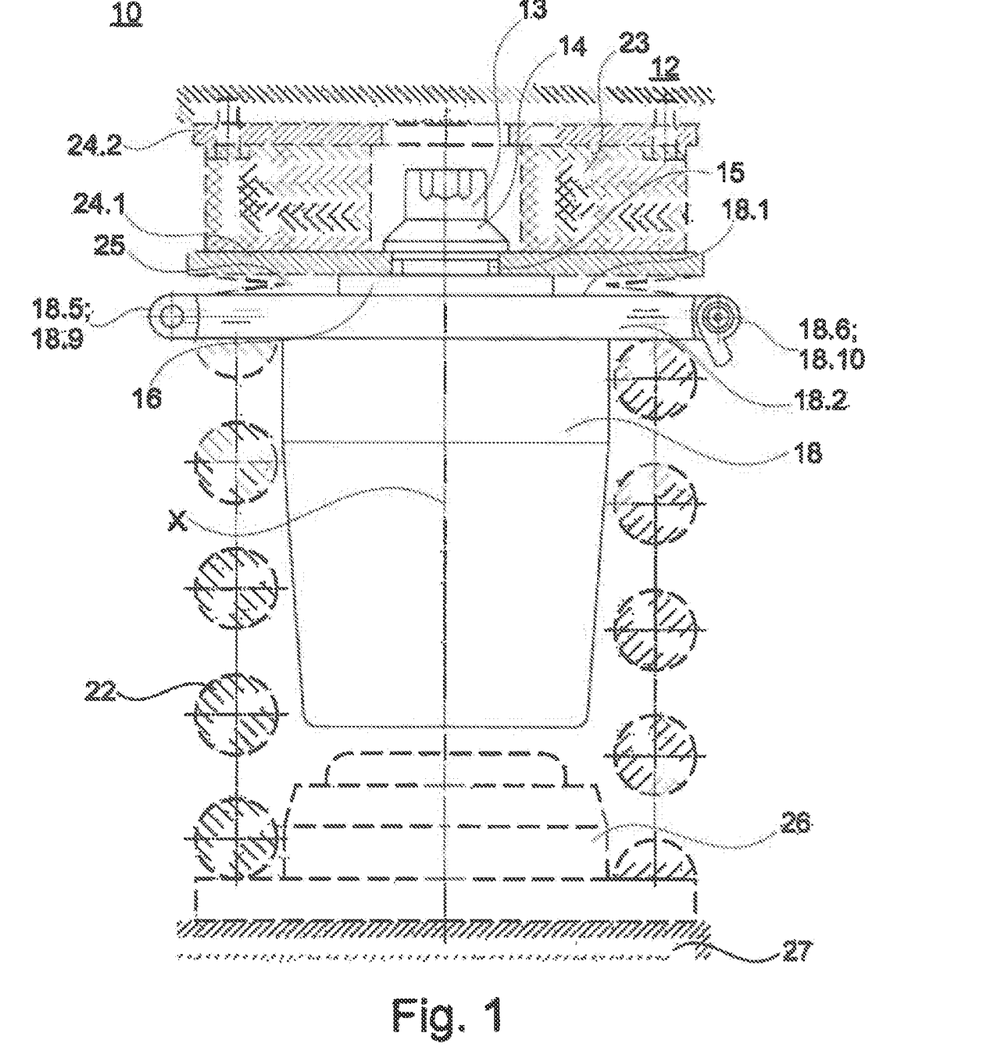
FIG. 1 shows a schematic front view of an exemplary embodiment of a level control system according to the disclosed embodiments with a level control cylinder and with a level control piston in the retracted state.

FIG. 1 shows a schematic front view of an exemplary embodiment of a level control system 10 with a level control cylinder 18 and with a level control piston 16 in the retracted state.

The level control piston 16 is, in FIG. 1, in the retracted state in an end position with the minimum stroke, or no stroke, of the level control system 10.

The level control system 10 is, according to FIG. 1, provided on a vehicle or a rail vehicle or a car body 12.

For example, the level control system 10 is configured with a first fixing disk 24.1, a second fixing disk 24.2 and an interposed multi-layer spring 23.

The multi-layer spring 23 is provided as a ring-shaped multi-layer spring.

The level control system 10 is fastened to the rail vehicle or to the car body 12 using the second fixing disk 24.2.

An expedient connection between the multi-layer spring 23, the second fixing disk 24.2 and the car body 12 with the level control piston 16 is provided using the first fixing disk 24.1.

In particular, a single fastening element 13 projects into the level control piston 16.

The fastening element 13 is arranged centrally in the level control system 10 or the level control piston 16 and the level control cylinder 18.

An expedient connection of the level control piston 16 to the level control cylinder 18 is available using the single, centrally arranged fastening element 13.

In this way, the installation or maintenance effort and a structural space saving can be achieved.

The fastening element 13 is arranged with a holding disk or washer 14 on the first fixing disk 24.1, in particular using a head of the fastening element 13.

The first fixing disk 24.1 can thus be connected in an expedient manner to the level control piston 16 using the single, centrally arranged fastening element 13.

The head of the fastening element 13 is positioned within the ring-shaped multi-layer spring 23.

In this way, the structural space along the multi-layer spring 23 can be advantageously utilized for the centrally arranged fastening element 13.

A reduction in the structural space required for the level control system 10 is possible.

Furthermore, at least two pins 15 are provided according to FIG. 1, which pins, below the holding disk 14, project through the first fixing disk 24.1 into the level control piston 16.

Using the pins 15, the first fixing disk 24.1 is connected to the level control piston 16 in a rotationally secured and positionally oriented manner.

The level control cylinder 18 is configured with an open cylinder side 18.1 from which the level control piston 16 can project or slide out. A stroke or a height adjustment of the level control system 10 can thus be achieved.

Furthermore, the level control cylinder 18 has a collar-like shoulder 18.2 along the open cylinder side 18.1.

The collar-like shoulder or circumference 18.2 of the level control cylinder 18 is configured as a shoulder in relation to the cylindrical basic shape of the level control cylinder 18.

A bellows 25 is arranged between the collar-like shoulder 18.2 of the level control cylinder 18 and the first fixing disk 24.1.

The bellows 25 is configured between the collar-like shoulder 18.2 and the first fixing disk 24.1 such that the level control system 10, in particular the level control cylinder 18 and the level control piston 16, are protected against contamination.

A first and a second hydraulic connector 18.9 and 18.10 are furthermore arranged along the collar-like shoulder 18.2 of the level control cylinder 18.

In particular, first and second bosses 18.5 and 18.6 are provided along the collar-like shoulder 18.2 of the level control cylinder 18, onto which or in which bosses the first and second hydraulic connectors 18.9 and 18.10 are integrally formed or received.

The first and second bosses 18.5 and 18.6 may be designed as a cutout or milled-out portion for receiving the first and second hydraulic connectors 18.9 and 18.10.

The first and second bosses 18.5 and 18.6 are formed integrally on the collar-like shoulder 18.2, specifically in this case such that the bosses 18.5 and 18.6 and the collar-like shoulder 18.2 are formed from a single workpiece and material.

In FIG. 1, the bosses 18.5 and 18.6 are provided such that they project beyond the outer diameter of the collar-like shoulder 18.2.

The first and second hydraulic connectors 18.9 and 18.10 can thus be received, inserted and positioned in the first and second bosses 18.5 and 18.6.

With respect to the longitudinal axis X of the level control cylinder 18, the hydraulic connectors 18.9 and 18.10 can be positioned in a tangentially running manner on the collar-like shoulder 18.2, in particular on the circular outer diameter of the collar-like shoulder 18.2, using the first and second bosses 18.5 and 18.6.

In relation to the disk-shaped main body of the collar-like shoulder 18.2 and/or the longitudinal axis X of the level control cylinder 18, the first and second hydraulic connectors 18.9 and 18.10 tangentially adjoin the collar-like shoulder 18.2.

Consequently, external fluid lines can be advantageously connected in terms of flow tangentially to the level control cylinder 18, in particular to the first and second hydraulic connectors 18.9 and 18.10.

The hydraulic connectors 18.9 and 18.10 may be connected in non-positively and/or positively locking fashion to the bosses 18.5 and 18.6 of the collar-like shoulder 18.2.

In particular, the hydraulic connectors 18.9 and 18.10 may be welded, adhesively bonded, screwed or clamped to or on the bosses 18.5 and 18.6 of the collar-like shoulder 18.2, pressed into the bosses 18.5 and 18.6, or the like.

The first and second hydraulic connectors 18.9 and 18.10 may be formed as one part or as several parts with the collar-like shoulder 18.2 of the level control cylinder 18.

In the context of the disclosed embodiments, the hydraulic connectors 18.9 and 18.10 are always configured and arranged such that external fluid lines can be connected in a tangential form to the level control system 10.

The first hydraulic connector 18.9 may be provided as an inflow or fluid inlet.

The second hydraulic connector 18.10 may be configured as an outflow or fluid outlet or as a drain valve.

In this context, a configuration of the second hydraulic connector 18.10 as a pressure relief valve is also conceivable.

Furthermore, the first and second hydraulic connectors 18.9 and 18.10 can be used in an inverted manner with regard to their function.

It is also conceivable that one of the hydraulic connectors 18.9 and 18.10 is used both as a fluid inlet and a fluid outlet, while the other can be used, for example, as a pressure relief valve.

The configuration of the collar-like shoulder or circumference 18.2, in particular the layer thickness of the shoulder 18.2, is based in particular on the size of the first and second hydraulic connectors 18.9 and 18.10.

Thus, the collar-like shoulder 18.2 may be designed with any desired collar thickness in a manner dependent on the application-specific requirements.

In particular, the configuration of the first and second hydraulic connectors 18.9 and 18.10 is decisive for the provided thickness of the collar-like shoulder 18.2.

In this way, a structural-space-saving configuration of the level control system 10, and in particular of the level control cylinder 18, can be provided.

Furthermore, the level control system 10 according to FIG. 1 is connected to a running gear 27 via a stop buffer 26.

A spiral spring 22 is arranged between the stop buffer 26 and the level control cylinder 18.

Figure 2:
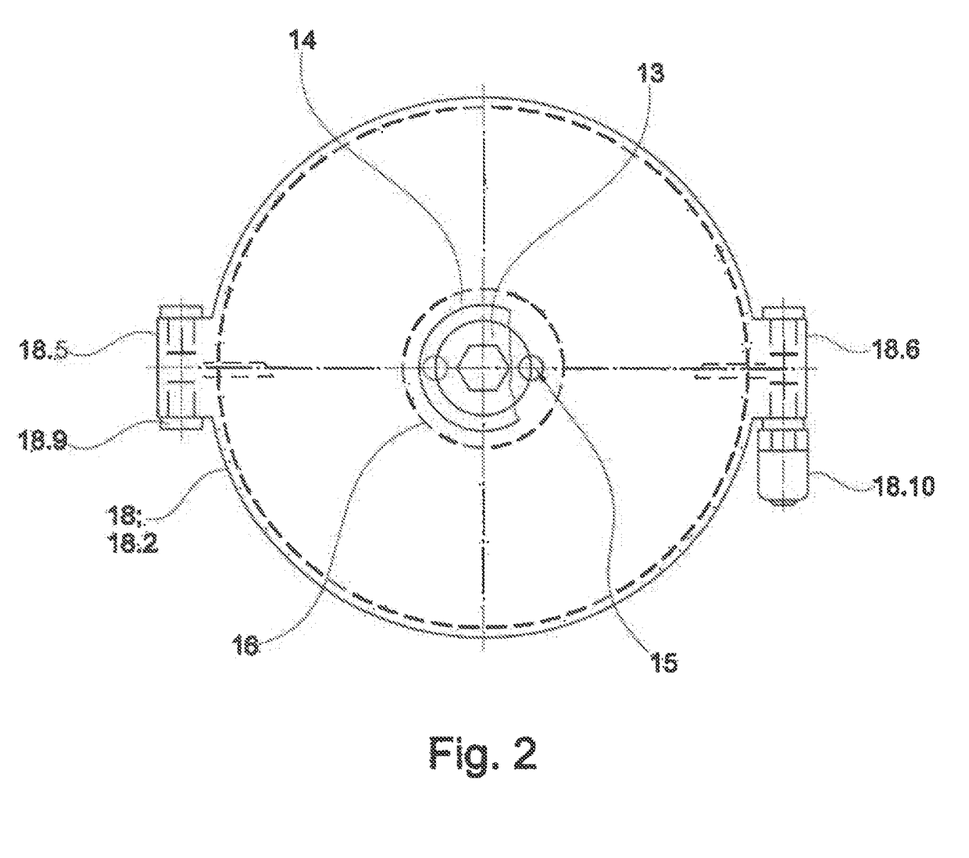
FIG. 2 shows a schematic plan view of the exemplary embodiment according to FIG. 1.

FIG. 2 shows a schematic plan view of the exemplary embodiment according to FIG. 1.

It can be seen from FIG. 2 that the first and second hydraulic connectors 18.9 and 18.10 are formed integrally in tangentially running bosses 18.5 and 18.6 on the collar-like shoulder 18.2 of the level control cylinder 18.

In particular, the first and second bosses 18.5 and 18.6 are illustrated in FIG. 2 as protruding bosses 18.5 and 18.6.

The first hydraulic connector 18.9 is received and positioned, in particular inserted, in the first protruding boss 18.5.

The second hydraulic connector 18.10 is received and positioned, in particular inserted, in the second protruding boss 18.6.

As per FIG. 2, the second hydraulic connector 18.10 may be regarded for example as a blanking valve or a drain valve or an overpressure valve.

It is thus possible for an external fluid line to be connected in a circumferential direction of the circular main body of the collar-like shoulder 18.2 to the first or second hydraulic connector 18.9 and 18.10.

Centrally in the level control cylinder 18, the level control piston 16 is arranged coaxially with respect to the single central fastening element 13 and the holding disk 14.

Also shown in FIG. 2 are the pins 15 which provide a rotational securing action and position orientation between the first fixing disk 24.1 and the level control piston 16.

Figure 3:
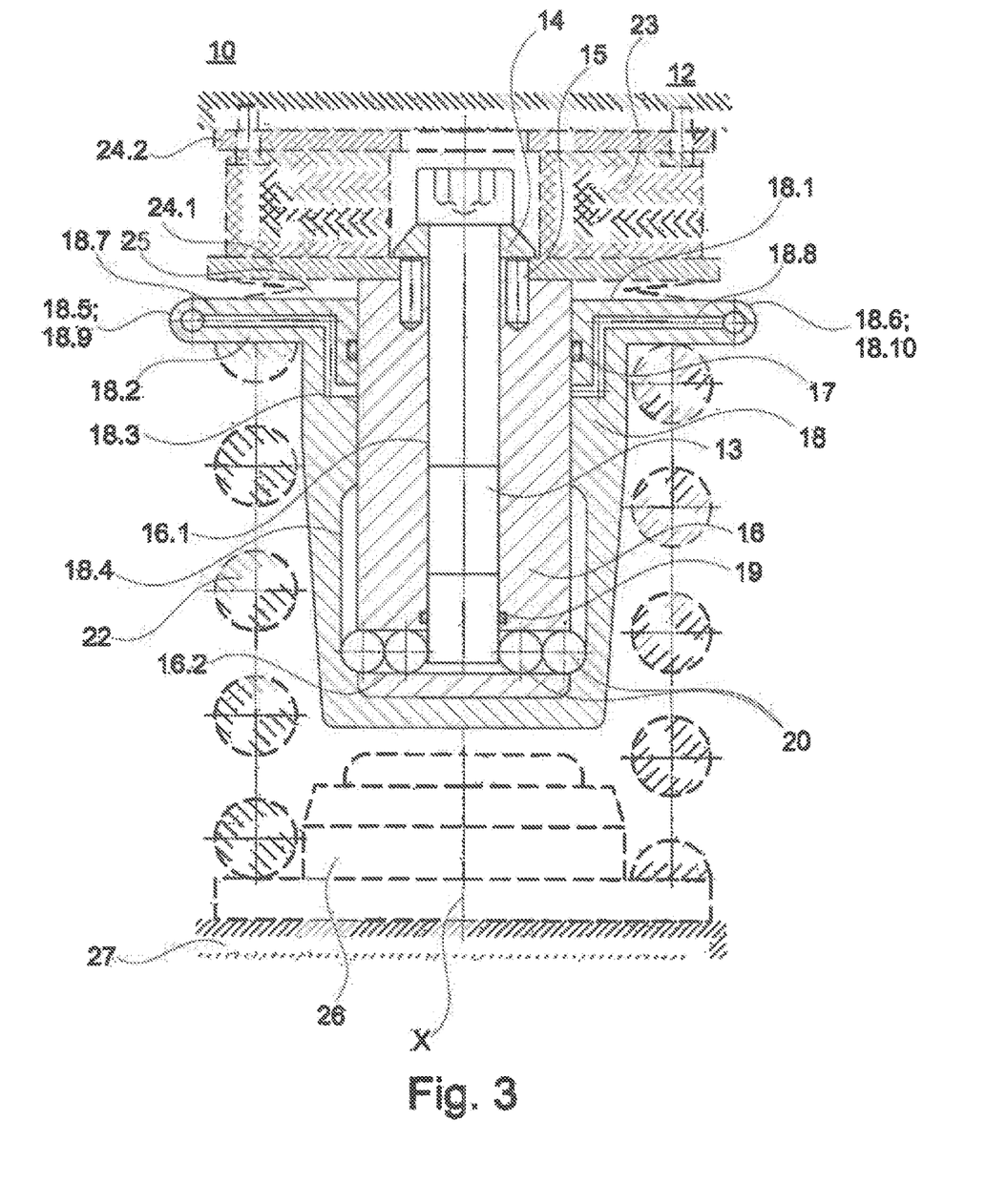
FIG. 3 shows a schematic sectional view of the exemplary embodiment according to FIG. 1.

FIG. 3 shows a schematic sectional view of the exemplary embodiment according to FIG. 1.

Compared to the illustration from FIG. 1, the internal structure of the level control piston 16 and of the level control cylinder 18 is additionally apparent from FIG. 3.

Below the holding disk 14, the pins 15 are shown which extend through the first fixing disk 24.1 into the level control piston 16.

Using the pins 15, a rotational relative movement between the level control piston 16 and the first fixing disk 24.1 can be prevented.

A rotational stop between the first fixing disk 24.1 and the level control piston 16 is provided using the pins 15.

The pins 15 likewise serve for the correct positioning of the first fixing disk 24.1.

The level control piston 16 is configured with a substantially constant or uniform outer diameter over its entire longitudinal extent.

The level control piston 16 has no collar, collar-like shoulder or the like.

The level control piston 16 is designed with an almost identical or constant outer diameter over the entire longitudinal extent.

A simple, inexpensive design of the level control piston 16 is thus provided.

Furthermore, in the retracted state, the level control piston 16 may optionally be entirely or at least substantially retracted into or received in the level control cylinder 18.

A minimal structural height of the level control system 10 can be achieved using the collarless level control piston 16 with constant outer diameter.

The minimal structural height of the exemplary embodiment according to FIGS. 1 and 2 is optionally achieved when the first fixing disk 24.1 lies almost on the collar-like shoulder 18.2 of the level control cylinder 18, and is spaced apart from the collar-like shoulder 18.2 only by the compressed bellows 25.

The minimal structural height of the level control system can be further reduced if the first fixing disk 24.1 lies on the collar-like shoulder 18.2 of the level control cylinder 18 and the compressed bellows 25 protrudes entirely into a ring-shaped cutout of the collar-like shoulder 18.2, that is to say is received entirely by the cutout.

The actual stroke limitation of the exemplary embodiment as per FIGS. 1 and 2 may however be realized using one of the two end stops of the guide groove, which are provided by a connection or an interaction between the fastening element in the level control piston, the at least one guide element and the one or more guide grooves in the level control cylinder.

Thus, using the level control piston 16 with a substantially constant diameter, a significant reduction in the structural space can thus be achieved, in particular in the region between the first fixing disk 24.1 and the open cylinder side 18.1 or the collar-like shoulder 18.2 of the level control cylinder 18.

The level control piston 16 is movably received in an inner diameter 18.3 of the level control cylinder 18.

Furthermore, the level control piston 16 has a central bore 16.1 in which the fastening element 13 is received.

In FIG. 3, the fastening element 13 is configured as a screw.

The central bore 16.1 of the level control piston 16 at least partially has an internal thread for the screw connection of the fastening element 13.

Furthermore, the central bore 16.1 of the level control piston 16 has a piston seal 19.

The central bore 16.1 or an inner diameter 18.3 of the level control cylinder 18 is thus expediently sealed with respect to the received fastening element 13.

By virtue of the fastening element or the screw 13 being inserted into the central bore 16.1 of the level control piston 16, guide elements 20 are expediently positioned within a receiving bore 16.2 of the level control piston 16.

In particular, the guide elements 20 are positioned in positively locking fashion in the receiving bore 16.2 using the fastening element 13 such that the guide elements 20 at least partially project beyond the outer diameter of the level control piston 16.

The level control cylinder 18 is configured, along the inner diameter 18.3, with guide grooves 18.4 into which the guide elements 20 can project.

A relative movement of the level control piston 16 with respect to the level control cylinder 18 can thus be limited with the aid of the fastening element 13, the guide elements 20 and the guide grooves 18.4.

A relative movement of the level control piston 16 with respect to the lift height or a maximum lift of the level control system 10 can be predefined using the guide grooves 18.4, which can be configured as required.

The level control piston 16 is extended by introducing a fluid into the inner diameter 18.3 of the level control cylinder 18 until the guide elements 20 abut against the grooves 18.4 of the level control cylinder 18.

In this context, an extension movement of the level control piston beyond the maximum intended stroke is prevented by a stop in the form of the guide elements 20 with the groove 18.4 or the grooves 18.4.

The level control piston can be retracted by releasing fluid pressure from the inner diameter 18.3 of the level control cylinder 18 or by applying a vacuum.

The retracting movement of the level control system 10 is ended, that is to say a minimum stroke is reached, as soon as the guide elements 20 again form a stop along the groove 18.4 or the grooves 18.4.

The minimum stroke may furthermore also be attained when or as soon as the first fixing disk 24.1 comes into contact with the open cylinder side 18.1.

Alternatively, a minimum stroke may be attained as soon as the level control piston 16 abuts against the level control cylinder 18 at the bottom side.

Furthermore, it is conceivable that the level control piston 16 can be held at a specific height or lifting height by virtue of a specific fluid volume or fluid pressure being enclosed in the inner diameter 18.3 of the level control cylinder 18.

In this context, the level control piston 16 can be positioned along the inner diameter 18.3 of the level control piston 18 in a manner deviating from the stop positions.

Furthermore, using the configuration of the guide grooves 18.4, in interaction with the guide elements 20, a rotational securing action or relative-rotation securing action or a rotational stop can be provided as required.

In particular, using rectilinearly running guide grooves 18.4, a relative rotation of the level control piston 16 with respect to the level control cylinder 18 can be prevented.

A relative-rotation securing action or a rotational securing action can thus be formed in an integral manner using an interaction of the guide elements 20 and correspondingly configured grooves 18.4 of the level control cylinder 18.

A maximum, arbitrarily configurable relative movement between the level control piston 16 and the level control cylinder 18 can be provided.

Provision may be made whereby the grooves 18.4 are designed to provide a linear guide for the level control piston 16.

Furthermore, in the context of the disclosed embodiments, an expedient connection of the level control piston 16 to the level control cylinder 18 can be achieved using the single, centrally arranged fastening element 13.

The connection of the level control piston 16 to the level control cylinder 18 is realized indirectly using the fastening element 13 in interaction with the guide elements 20 and the grooves 18.4 of the level control cylinder 18.

Furthermore, a cylinder seal 17 is arranged along the inner diameter 18.3 of the level control cylinder 18.

The cylinder seal 17 enables the inner diameter 18.3 of the level control cylinder 18 to be sealed with respect to the outer diameter of the level control piston 16, wherein the level control piston 16 is movably received in the inner diameter 18.3.

The sealing of the inner diameter 18.3 is provided using the cylinder seal 17 according to FIG. 3 along the sliding surface of the level control piston 16 in the level control cylinder 18.

In FIG. 3, the cylinder seal 17 is configured as an O-ring.

Alternatively, the cylinder seal 17 may be configured as any desired sealing compound or as a ring-shaped sealing compound with any desired cross section. An expedient cylinder seal 17 can be provided.

Using the cylinder seal 17, the inner diameter 18.3 of the level control cylinder is closed off in a fluid-tight manner with respect to the open cylinder side 18.1 of the level control cylinder 18 and in particular with respect to the surrounding atmosphere.

According to the sectional view shown in FIG. 3, the first and second hydraulic connectors 18.9 and 18.10 are arranged so as to tangentially adjoin the collar-like shoulder 18.2 of the level control cylinder 18.

A first and a second fluid channel 18.7 and 18.8 are configured integrally with the level control cylinder 18.

In the collar-like shoulder 18.2, the first and second fluid channels 18.7 and 18.8 extend orthogonally with respect to the longitudinal axis X of the level control cylinder 18.

Thus, the collar-like shoulder 18.2 of the level control cylinder can be configured with a thickness which is provided to be large enough to expediently form the first and second fluid channels 18.7 and 18.8 in conjunction with the first and second hydraulic connectors 18.9 and 18.10.

The thickness of the collar-like shoulder 18.2 may accordingly be provided to be so large as to permit the arrangement of first and second fluid channels 18.7 and 18.8, and also first and second hydraulic connectors 18.9 and 18.10, which must be configured expediently.

Furthermore, the first and second fluid channels 18.7 and 18.8 are integrated at least in certain portions in the cylinder wall of the level control cylinder 18.

The first hydraulic connector 18.9 is connected in terms of flow via the first fluid channel 18.7 to the inner diameter 18.3 of the level control cylinder 18.

The second hydraulic connector 18.10 is connected in terms of flow via the second fluid channel 18.8 to the inner diameter 18.3 of the level control cylinder 18.

The first and second fluid channels 18.7 and 18.8 according to FIG. 3 thus extend from the hydraulic connectors 18.9 and 18.10 along the collar-like shoulder 18.2 and through a part of the cylinder wall of the level control cylinder 18, in particular in certain portions in the vertical direction according to FIG. 3.

Furthermore, the first and second fluid channels 18.7 and 18.8 according to FIG. 3 are of substantially Z-shaped configuration.

Furthermore, the first and second fluid channels 18.7 and 18.8 according to FIG. 3 open, beyond the cylinder seal 17, into the inner diameter 18.3 of the level control cylinder 18.

In particular, the first and second fluid channels 18.7 and 18.8 open into the inner diameter 18.3 on that side of the cylinder seal 17 which faces away from the open cylinder side 18.1.

Grooves or flutes may furthermore be provided along the inner diameter 18.3 of the level control cylinder 18 or outer diameter of the level control piston 16, such that the fluid can expediently flow into the inner diameter 18.3 from the fluid channels 18.7 and 18.8.

The cylinder seal 17 may for example be provided to have such elasticity that such grooves or flutes along the outer diameter of the level control piston 16 can expediently be sealed using the cylinder seal 17.

Using the configuration of the fluid channels 18.7 and 18.8 as required, it is conceivable that the fluid channels open into the inner diameter 18.3 of the level control cylinder 18 at any desired position which is expedient in the specific application.

By virtue of in particular the hydraulic connectors 18.9 and 18.10, the fluid channels 18.7 and 18.8, the cylinder seal 17 and the guide grooves 18.4 for the guide elements 20 being configured in the level control cylinder 18, an integral construction of the level control cylinder 18 is realized.

Accordingly, the level control piston 16 can be of relatively simple configuration, in particular with an at least substantially constant outer diameter.

Furthermore, simply the tangential arrangement of the hydraulic connectors 18.9 and 18.10 on the fixed level control cylinder 18 realizes a space-saving arrangement and also avoids the risk of a breakaway or detachment of an external fluid line.

In summary, the disclosed embodiments constitute an integral construction in order to advantageously implement a space-saving configuration and also functional characteristics of the system in a simple manner.

In general, the tangential arrangement of the hydraulic connectors on the level control cylinder constitutes both a space-saving and a functionally advantageous solution, wherein the rotation of the connectors about the longitudinal axis of the level control cylinder 18 or of the level control piston 16 is prevented through the use of an integrated rotational stop.

The disclosed embodiments are finally capable of providing an integral construction of a level control system, in particular with advantageously configured hydraulic connectors.

REFERENCE DESIGNATIONS

10 Level control system
12 Car body (of a rail vehicle)
13 Fastening element
14 Holding disk
15 Pin
16 Level control piston
16.1 Central bore
16.2 Receiving bore
17 Cylinder seal
18 Level control cylinder
18.1 Open cylinder side
18.2 Collar-like shoulder
18.3 Inner diameter
18.4 Guide groove
18.5 First boss
18.6 Second boss
18.7 First fluid channel
18.8 Second fluid channel
18.9 First hydraulic connector
18.10 Second hydraulic connector
19 Piston seal
20 Guide element
22 Spiral spring
23 Multi-layer spring
24.1 First fixing disk
24.2 Second fixing disk
25 Bellows
26 Stop buffer
27 Running gear
X Longitudinal axis (of the level control cylinder and of the level control piston)

The invention claimed is:

1. A level control system for adjusting the level of a rail vehicle, the system comprising:
at least one level control cylinder; and
one level control piston,
wherein the level control piston is at least partially movably received in the level control cylinder,
wherein the level control system has at least one first hydraulic connector,
wherein the level control cylinder or the level control piston has a collared shoulder in which at least one first fluid channel connected to the first hydraulic connector is arranged,
wherein at least one first boss for receiving the first hydraulic connector is provided along the collared shoulder, and
wherein the first boss is-arranged tangentially with respect to an outer diameter of the collared shoulder and forms an opening in a horizontal direction relative to the longitudinal axis and connectable to at least one external fluid connection such that the at least one external fluid connection is connectable tangentially on the collared shoulder to the at least one first hydraulic connector.

2. The level control system of claim 1, wherein the at least one first boss is formed integrally on the collared shoulder.

3. The level control system of claim 2, wherein the at least one first boss is formed in a single-piece and/or materially bonded manner on the collared shoulder.

4. The level control system of claim 3, wherein the at least one first hydraulic connector is connected in non-positively and/or positively locking fashion to the at least one first boss of the collared shoulder.

5. The level control system of claim 1, wherein the at least one first boss is formed as a cutout on the collared shoulder, such that the first hydraulic connector can be arranged on the first boss.

6. The level control system of claim 1, wherein the at least one first boss is formed as an elevation which projects beyond the outer diameter of the collared shoulder, such that the first hydraulic connector can be arranged on an outer side of the collared shoulder tangentially with respect to the outer diameter of the collared shoulder.

7. The level control system of claim 1, wherein the at least one first hydraulic connector is connected in non-positively and/or positively locking fashion to the at least one first boss of the collared shoulder.

8. The level control system of claim 1, wherein the level control piston has a substantially constant outer diameter over its entire length.

9. The level control system of claim 1, wherein a single fastening element is provided for connecting the level control piston to the level control cylinder.

10. The level control system of claim 9, wherein the level control piston has a central bore which is designed for receiving the fastening element.

11. The level control system of claim 10, wherein at least one guide element is provided which, in conjunction with the fastening element, is positioned such that the level control cylinder provides a first and a second end stop for the relative movement of the level control piston with the at least one guide element.

12. The level control system of claim 11, wherein the guide element is provided so as to project out of the level control piston such that the guide element engages into a corresponding guide groove of the level control cylinder in order to provide a predefinable relative movement between level control piston and level control cylinder.

13. The level control system of claim 9, wherein the fastening element is a screw or bolt.

14. A level control system for adjusting the level of a rail vehicle, the system comprising:
at least one level control cylinder; and
one level control piston,
wherein the level control piston is at least partially movably received in the level control cylinder,
wherein the level control system has at least one first hydraulic connector,
wherein the level control cylinder or the level control piston has a collared shoulder in which at least one first fluid channel connected to the first hydraulic connector is arranged,
wherein at least one first boss for receiving the first hydraulic connector is provided along the collared shoulder, and
wherein the first boss is, in relation to a longitudinal axis of the level control cylinder or of the level control piston, arranged tangentially on the collared shoulder such that at least one external fluid connection is connectable tangentially on the collared shoulder to the at least one first hydraulic connector, wherein a single fastening element is provided for connecting the level control piston to the level control cylinder, wherein the level control piston has a central bore which is designed for receiving the fastening element, wherein at least one guide element is provided which, in conjunction with the fastening element, is positioned such that the level control cylinder provides a first and a second end stop for the relative movement of the level control piston with the at least one guide element, wherein the guide element is provided so as to project out of the level control piston such that the guide element engages into a corresponding guide groove of the level control cylinder in order to provide a predefinable relative movement between level control piston and level control cylinder.

15. The level control system of claim 14, wherein the at least one first boss is formed integrally on the collared shoulder.

16. The level control system of claim 15, wherein the at least one first boss is formed in a single-piece and/or materially bonded manner on the collared shoulder.

17. The level control system of claim 14, wherein the at least one first boss is formed as a cutout on the collared shoulder, such that the first hydraulic connector can be arranged on the first boss.

18. The level control system of claim 14, wherein the at least one first boss is formed as an elevation which projects beyond the outer diameter of the collared collar like shoulder, such that the first hydraulic connector can be arranged on an outer side of the collar-like shoulder tangentially with respect to the outer diameter of the collared shoulder.

19. The level control system of claim 14, wherein the level control piston has a substantially constant outer diameter over its entire length.

* * * * *